United States Patent Office 3,067,250
Patented Dec. 4, 1962

---

3,067,250
4-ARYL, 1,1-DI PROPYNYL-SEMICARBAZIDES
Phyllis D. Oja, Walnut Creek, Calif., assignor to The Dow Chemical Company, Midland, Mich., a corporation of Delaware
No Drawing. Filed Jan. 26, 1959, Ser. No. 788,734
4 Claims. (Cl. 260—552)

This invention is concerned with substituted semicarbazides and is particularly directed to 4-substituted 1,1-di(2-propynyl) semicarbazides corresponding to the formula

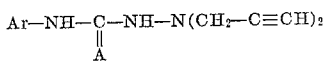

in which Ar represents a member of the group consisting of naphthyl, anthracyl, phenanthryl, substituted phenyl, substituted naphthyl, substituted anthracyl and substituted phenanthryl, wherein the substituents for said substituted radicals are selected from the group consisting of hydroxyl, nitro, halogen, and lower alkyl, A represents a chalkogen having an atomic weight of from 10 to 50. The term lower alkyl is used herein to designate an alkyl group containing from one to 4 carbon atoms inclusive. These novel compounds are crystalline solids somewhat soluble in many organic solvents such as methanol and benzene and of very low solubility in water. The new compounds are useful as parasiticides and are adapted to be employed as active toxic constituents of compositions for the control of many pests such as nematodes, insects and bacteria.

The novel semicarbazides of the present invention may be prepared by causing 1,1-di(2-propynyl)-hydrazine to react with an isocyanate or isothiocyanate corresponding to the formula Ar—N=C=A The reaction is conveniently carried out by contacting the reactants together in an inert liquid organic reaction medium such as methylene chloride, diethyl ether, hexane, or benzene. Good results are obtained when employing substantially equimolecular proportions of the reactants. The reaction is somewhat exothermic and takes place readily at temperatures of from 15° to 80° C. The temperature may be controlled by regulating the rate of contacting the reactants and by external cooling.

In carrying out the reaction, the hydrazine reactant and the isocyanate reactant are contacted together portionwise in the reaction solvent and the resulting mixture thereafter maintained for a period of time at the contacting temperature range.

Upon completion of the reaction, the product may be separated by any of several methods. In one method, a portion of the reaction solvent may be removed by evaporation or partial distillation under reduced pressure. During the removal of the solvent, the desired product precipitates in the reaction mixture as a crystalline solid. In an alternative method, the reaction solvent may be diluted with a liquid such as hexane in which the desired semicarbazide is not soluble, thereby causing the desired product to precipitate. Following either method, the desired semicarbazide product may be separated by filtration or decantation. The product may be purified in conventional fashion by recrystallization from suitable organic solvents.

The following examples illustrate the invention but are not to be construed as limiting:

*Example 1.—4-(4-Chlorophenyl)-1,1-Di(2-Propynyl) Semicarbazide*

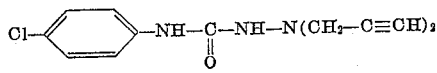

1,1-di(2-propynyl)-hydrazine (10.8 grams; 0.1 mole) was contacted portionwise with stirring with 15.3 grams (0.1 mole) of 4-chlorophenyl isocyanate dissolved in 125 milliliters of diethyl ether. The addition was carried out over a period of 10 minutes and at a temperature of 25°–40° C. The reaction mixture was thereafter set aside at room temperature to complete the reaction. After one hour, 50 milliliters of benzene was added to the reaction mixture and the resulting mixture heated to the boiling temperature. The heated mixture was then diluted with two volumes of hexane and thereafter cooled. During the dilution and cooling, a 4-(4-chlorophenyl)-1,1-di(2-propynyl) semicarbazide product precipitated in the reaction mixture as a crystalline solid and was separated therefrom by filtration. This product was successively recrystallized from methanol and from a benzene-hexane mixture and the recrystallized product found to be in the form of colorless crystalline plates having a melting point of 109.5°–110.5° C.

*Example 2.—4-(4-Chlorophenyl)-1,1-Di(2-Propynyl)-3-Thiosemicarbazide*

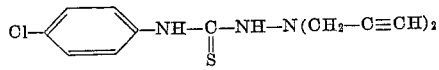

4-chlorophenyl isothiocyanate (6.5 grams; 0.042 mole) was contacted portionwise with stirring with 4 grams (0.037 mole) of 1,1-di(2-propynyl)-hydrazine dissolved in 25 milliliters of benzene. The addition was carried out over a period of 5 minutes at a temperature of 25°–40° C. and the resulting mixture thereafter heated at the boiling temperature for 5 minutes to insure completion of the reaction. The reaction mixture was then cooled to room temperature and diluted with an equal volume of hexane. During the dilution, a 4-(4-chlorophenyl-1,1-di(2-propynyl)-3-thiosemicarbazide product precipitated in the reaction mixture as a crystalline solid and was separated by filtration. This product was successively washed with a mixture of diethyl ether and hexane and the washed product found to have a melting point of 133.5°–134.5° C.

*Example 3.—4-(3-Chlorophenyl)-1,1-Di(2-Propynyl) Semicarbazide*

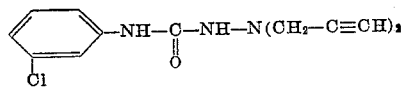

1,1-di(2-propynyl)-hydrazine (10.8 grams; 0.1 mole) was dissolved in 200 milliliters of diethyl ether and the resulting solution added portionwise with stirring to 15.3 grams (0.1 mole) of 3-chlorophenyl isocyanate dissolved in 250 milliliters of diethyl ether. The addition was carried out over a period of 10 minutes and at a temperature of from 20°–35° C. Following the contacting period, the reaction mixture was set aside for one day at room temperature. During this period, a 4-(3-chlorophenyl)-1,1-di(2-propynyl) semicarbazide product precipitated in the reaction mixture as a crystalline solid and was separated by filtration. This product was successively recrystallized from a benzene-hexane mixture and a diethyl ether-hexane mixture and the recrystallized product found to melt at 90.0°–91.0° C.

*Example 4.—4-(2,4,5-Trichlorophenyl)-1,1-Di(2-Propynyl)-Semicarbazide*

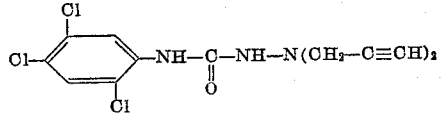

1,1-di(2-propynyl)-hydrazine (10.8 grams; 0.1 mole)

is contacted portionwise with stirring with 22.34 grams (0.1 mole) 2,4,5-trichlorophenyl isocyanate dissolved in 150 milliliters of toluene. The addition is carried out over a period of 10 minutes at a temperature of 25°–40° C., and the mixture is thereafter heated at a temperature of 75° C. for 30 minutes to insure completion of the reaction. The reaction mixture is then cooled to room temperature and diluted with twice its volume of petroleum ether. During the dilution, a 4-(2,4,5-trichlorophenyl)-1,1-di(2-propynyl) semicarbazide product precipitates in the reaction mixture as a crystalline solid, and is recovered by filtration. 4-(2,4,5-trichlorophenyl)-1,1-di(2-propynyl) semicarbazide has a molecular weight of 330.60.

*Example 5.—4-(4-Methylphenyl)-1,1-Di(2-Propynyl)-Semicarbazide* p-Tolyl isocyanate (26.6 grams; 0.20 mole) dispersed in 150 milliliters hexane was added slowly and with stirring to 21.6 grams (0.20 mole) of 1,1-di(2-propynyl)-hydrazine dispersed in 100 milliliters benzene. The contacting of the reactants was begun at room temperature, approximately 25°. The reaction was exothermic and the temperature of the reaction mixture rose spontaneously to about 50° C. during the contacting. The mixture was then allowed to stand for several hours at room temperature to complete the reaction. During the course of the reaction a crystalline product precipitated in the reaction mixture, and was removed therefrom by filtration, and recrystallized from hot acetone. As a result of these operations there was obtained a 4-(4-methylphenyl)-1,1-di(2-propynyl)-semicarbazide product melting at 117.5–119° C., and having contents of carbon of 69.47 percent, hydrogen 6.30 percent, and nitrogen 17.31 percent as contrasted with theoretical values 69.68, 6.28, and 17.42 percent respectively.

*Example 6.—4-(2-Methylphenyl)-1,1-Di(2-Propynyl)-Semicarbazide* o-Tolyl isocyanate (26.6 grams; 0.20 mole) dispersed in 150 milliliters hexane was added slowly with stirring to 21.6 grams (0.20 mole) of 1,1-di(2-propynyl)-hydrazine dispersed in 100 milliliters benzene. The reaction was carried out in a manner exactly similar to that of Example 6. The resulting material recrystallized from hot acetone was a 4-(2-methylphenyl)-1,1-di(2-propynyl)-semicarbazide product melting at 125.0–126.0° C. and having contents of carbon, hydrogen and nitrogen of 69.60 percent, 6.29 percent, and 17.52 percent as compared with theoretical values of 69.68, 6.28, and 17.42 percent respectively.

*Example 7.—4-(3-Methylphenyl)-1,1-Di(2-Propynyl)-Semicarbazide* m-Tolyl isocyanate (26.6 grams; 0.20 mole) dispersed in 100 milliliters of methylene dichloride was added slowly with stirring to 21.6 grams (0.20 mole) of 1,1-di(2-propynyl)-hydrazine dispersed in 150 milliliters methylene dichloride. The reaction, separation, and purification were carried out in a manner similar to that in Example 5. As a result of this process there was obtained a 4-(3-methylphenyl)-1,1-di(2 - propynyl) - semicarbazide product as a crystalline solid melting in the range of 99–104.5° C. The product had contents of carbon, hydrogen, and nitrogen of 69.33, 5.90, and 17.42 percent respectively as compared to theoretical values of 69.68 percent, 6.28 percent, and 17.42 percent respectively.

*Example 8.—4-(1-Naphthyl)-1,1-Di(2-Propynyl)-Semicarbazide*

1-naphthyl isocyanate (16.9 grams; 0.1 mole) dispersed in 70 milliliters of benzene was added dropwise over a period of about 2 minutes and with stirring, to 10.8 grams (0.1 mole) of 1,1-di(propynyl)hydrazine dispersed in 80 milliliters of benzene. The contacting of the reactants began at room temperature approximately 22.5° C. The reaction was exothermic and the reaction mixture warmed to about 48° C. during the contacting. The resulting reaction mixture was then allowed to stand for 30 minutes to complete the reaction, during which time it cooled to room temperature. During the cooling a crystalline product precipitated in the reaction mixture and was separated by filtration and thereafter recrystallized from acetone. As a result of these operations there was obtained 4-(1-naphthyl)-1,1-di(2-propynyl)-semicarbazide product as a crystalline solid melting at 166.0° to 168.5° C.

In a similar manner other semicarbazides may be prepared as follows:

4-(2,4-dichlorophenyl)-1,1-di(2-propynyl) semicarbazide by reacting together 1,1-di(2-propynyl)-hydrazine and 2,4-dichlorophenyl isocyanate.

4-(2,6-dichlorophenyl)-1,1-di(2 - propynyl)-3-thiosemicarbazide by reacting together 1,1-di(2-propynyl)-hydrazine and 2,6-dichlorophenyl isothiocyanate.

4-(2-methyl-4-chlorophenyl)-1,1-di(2-propynyl) semicarbazide by reacting together 1,1-di(2-propynyl)-hydrazine and 2-methyl-4-chlorophenyl isocyanate.

4-(2,4,6-trichlorophenyl)-1,1-di(2-propynyl) - 3 - thiosemicarbazide by reacting together 1,1-di(2-propynyl)-hydrazine and 2,4,6-trichlorophenyl isothiocyanate.

4-(3,4-dichlorophenyl)-1,1-di(2 - propynyl) semicarbazide by reacting together 1,1-di(2-propynyl)-hydrazine and 3,4-dichlorophenyl isocyanate.

4-(γ-anthracyl)-1,1-di(2-propynyl) semicarbazide by reacting together 1,1-di(2-propynyl)-hydrazine and γ-anthracyl isocyanate.

4-(2-phenanthryl)-1,1-di(2-propynyl)-3 - thiosemicarbazide by reacting together 1,1-di(2-propynyl)-hydrazine and 2-phenanthryl isothiocyanate.

4-(2,4-ditertiarybutylphenyl)-1,1-di(2-propynyl) semicarbazide by reacting together 1,1-di(2-propynyl)-hydrazine and 2,4-ditertiarybutylphenyl isocyanate.

4-(2,4,6-trimethylphenyl)-1,1-di(2-propynyl) semicarbazide by reacting together 1,1-di(2-propynyl)-hydrazine and 2,4,6-trimethylphenyl isocyanate.

4-(4-fluorophenyl)-1,1-di(2-propynyl) - 3 - thiosemicarbazide by reacting together 1,1-di(2-propynyl)-hydrazine and 4-fluorophenyl isothiocyanate.

4-(2,4-dibromophenyl)-1,1-di(2 - propynyl)-3-thiosemicarbazide by reacting together 1,1-di(2-propynyl)-hydrazine and 2,4-dibromophenyl isothiocyanate.

4-(2,6-diiodophenyl)-1,1-di(2-propynyl)-3-thiosemicarbazide by reacting together 1,1-di(2-propynyl)-hydrazine and 2,6-diiodophenyl isothiocyanate.

4-(2-methyl-4-nitrophenyl) - 1,1 - di(2-propynyl) semicarbazide by reacting together 1,1-di(2-propynyl)-hydrazine and 2-methyl-4-nitrophenyl isocyanate.

4-(4-hydroxy-2-naphthyl) - 1,1 - di(2-propynyl)-3-thiosemicarbazide by reacting together 1,1-di(2-propynyl)-hydrazine and 4-hydroxy-2-naphthyl isothiocyanate.

4-(6-tertiarylbutyl-2-phenanthryl) - 1,1 - di(2-propynyl) semicarbazide by reacting together 1,1-di(2-propynyl)-hydrazine and 6-tertiarylbutyl-2-phenanthryl isocyanate.

4-(2,4-dinitrophenyl) - 1,1 - di(2-propynyl)-3-thiosemicarbazide by reacting together 1,1-di(2-propynyl)-hydrazine and 2,4-dinitrophenyl isothiocyanate.

4-(4-chloro-1-naphthyl)-1,1-di(2-propynyl) semicarbazide by reacting together 1,1-di(2-propynyl)-hydrazine and 4-chloro-1-naphthyl isocyanate.

The new semicarbazides of the present invention have been found to be useful as parasiticides and are adapted to be employed for the control of many pests. For such use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions or as water dispersions with or without the aid of dispersing or emulsifying agents. In a representative operation, the application as a wetting spray to cranberry bean plants of aqueous compositions containing 2,400 parts by weight of 4-(4-chlorophenyl)-1,1-di(2-propynyl) semicarbazide as sole toxicant per million parts of ultimate composition gave a 100 percent kill of a population of Southern army worms feeding on the said bean plants.

The 1,1-di(2-propynyl)-hydrazine employed as a starting material as herein described may be prepared by reacting one molecular proportion of propargyl bromide or propargyl chloride with at least two molecular proportions of hydrazine in an inert solvent such as alcohol. In carrying out the reaction, the propargyl halide is contacted portionwise with the hydrazine at a temperature of from 0° to 80° C. Upon completion of the reaction, the reaction mixture is fractionally distilled under reduced pressure to separate the desired hydrazine product. 1,1-di(2-propynyl)-hydrazine is a viscous liquid boiling at 61°–63° C. at 4 millimeters pressure.

Various methods have been described for the preparation of substituted aryl isocyanates and isothiocyanates such as are used herein as intermediates. In one method, the corresponding substituted arylamine such as a substituted aniline or naphthylamine is dissolved in benzene and the solution is added slowly over a period of time to a saturated benzene solution of phosgene to which excess phosgene is continuously supplied. Upon completion of the reaction, the isocyanate may be recovered by fractional distillation under reduced pressure, or by precipitation from solvent solution.

The isothiocyanates employed as intermediates as herein described may be prepared by causing the correponding substituted arylamine to react with ammonium hydroxide and carbon disulfide to form an intermediate ammonium dithiocarbanilate. This intermediate is further treated by heating with an excess of aqueous lead nitrate under neutral conditions in the reaction mixture. The desired substituted aryl isothiocyanate may then be separated by distillation, recrystallization, and the like.

The present application is a continuation-in-part of my co-pending application Serial Number 680,012, filed August 23, 1957, now abandoned.

I claim:

1. A compound corresponding to the formula

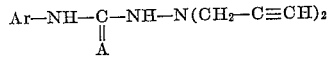

in which Ar represents a member of the group consisting of naphthyl, anthracyl, phenanthryl, substituted phenyl, substituted naphthyl, substituted anthracyl and substituted phenanthryl, wherein the substituents present in said substituted radicals are selected from the group consisting of hydroxyl, nitro, halogen, and lower alkyl, A represents a chalkogen having an atomic weight of from 10 to 50; and lower alkyl designates an alkyl group containing from 1 to 4 carbon atoms inclusive.

2. 4-(4-chlorophenyl) - 1,1 - di(2-propynyl) semicarbazide.

3. 4-(4-chlorophenyl) - 1,1 - di(2-propynyl)-3-thiosemicarbazide.

4. 4-(3-chlorophenyl) - 1,1 - di(2-propynyl) semicarbazide.

References Cited in the file of this patent

Diels: Berichte der Deut. Chem. Gesell., vol. 56B, p. 1936 (1923).